(12) United States Patent
Kitazawa (10) Patent No.: US 9,646,631 B2
(45) Date of Patent: May 9, 2017

(54) AUDIO SIGNAL PROCESSING APPARATUS AND METHOD THEREOF

(71) Applicant: CANON KABUSHIKI KAISHA, Tokyo (JP)

(72) Inventor: Kyohei Kitazawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 14/596,505

(22) Filed: Jan. 14, 2015

(65) Prior Publication Data

US 2015/0205575 A1    Jul. 23, 2015

(30) Foreign Application Priority Data

Jan. 20, 2014  (JP) ................................. 2014-008074

(51) Int. Cl.
*G10L 21/00*  (2013.01)
*G10L 21/0308*  (2013.01)
(Continued)

(52) U.S. Cl.
CPC ...... *G10L 21/0308* (2013.01); *G10L 21/0216* (2013.01); *G10L 15/20* (2013.01); *G10L 25/18* (2013.01)

(58) Field of Classification Search
CPC ............. G10L 21/0208; G10L 21/0232; G10L 21/0308; G10L 25/18; G10L 21/02; G10L 21/06; G10L 2021/02166; G10L 25/84; G10L 21/0216; G10L 15/00; G10L 15/20; G10L 19/26; G10L 11/04; G10L 15/12;
(Continued)

(56) References Cited

U.S. PATENT DOCUMENTS

| | | | |
|---|---|---|---|
| 2003/0023430 A1* | 1/2003 | Wang | G10L 19/26 704/226 |
| 2008/0167863 A1* | 7/2008 | Choi | G10L 21/0208 704/208 |
| 2013/0035933 A1* | 2/2013 | Hirohata | G10L 15/20 704/206 |

FOREIGN PATENT DOCUMENTS

| | | | |
|---|---|---|---|
| JP | 2005-258440 A | 9/2005 | |
| JP | 2011-227417 A | 11/2011 | |
| JP | 2012022120 | * 2/2012 | ............. G10L 21/02 |

OTHER PUBLICATIONS

Smaragdis et al., "Non-Negative Matrix Factorization for Polyphonic Music Transcription", 2003 IEEE Workshop on Applications of Signal Processing to Audio and Acoustics, Oct. 19-22, 2003, pp. 177-180.

(Continued)

*Primary Examiner* — Vivian Chin
*Assistant Examiner* — Ubachukwu Odunukwe
(74) *Attorney, Agent, or Firm* — Carter, DeLuca, Farrell & Schmidt, LLP (57) ABSTRACT

An audio signal in which a first audio component and a second audio component are mixed is inputted. The audio signal is transformed into a time-frequency signal representing relation between time and signal frequency. The time-frequency signal is divided into a plurality of bands. A time-frequency signal in a band, in which influence from the second audio component is small among the plurality of bands, is factorized into activity vectors composing a first activity matrix. The time-frequency signal transformed from the audio signal is factorized into activity vectors composing a second activity matrix using the first activity matrix as a teacher activity.

20 Claims, 10 Drawing Sheets

(51) Int. Cl.
*G10L 21/0216* (2013.01)
*G10L 15/20* (2006.01)
*G10L 25/18* (2013.01)

(58) Field of Classification Search
CPC .... G10K 21/0272; G10K 11/16; G10K 15/00;
H04R 1/40; H04R 3/00; H04R 29/00;
H04R 3/005; H04S 7/305; H04S 7/00;
H04S 5/02; H04S 7/30; H04S 1/002;
G01H 7/00; G01H 3/00; G01H 17/00;
G01S 3/8083
USPC ........ 700/94; 381/92, 94.2, 94.3, 94.1, 94.7,
381/56, 57, 59, 58, 103, 71.1, 71.11,
381/71.14; 704/205, 233, 226, 227, 228,
704/204, 500, 212, 206, 208, 236
See application file for complete search history.

(56) References Cited

OTHER PUBLICATIONS

Kameoka et al., "Complex NMF: A new sparse representation for Acoustic Signals", International Conference on Acoustics, Speech, and Signal Processing—ICASSP, pp. 3437-3440, Sep. 2008.
Futoshi Asano, "Array Signal Processing of Sound-Sound Source Localization, Tracking and Separation-", Acoustic Technology Series 16, Feb. 25, 2011, pp. 70-105.

\* cited by examiner

AUDIO SIGNAL PROCESSING APPARATUS AND METHOD THEREOF

BACKGROUND OF THE INVENTION

Field of the Invention

The present invention relates to audio signal processing for sound source separation or noise reduction.

Description of the Related Art

Recently, not only digital video cameras but also digital cameras can shoot a moving image, resulting in an increase in the opportunities of recording a sound. It is difficult to confirm a recorded sound during shooting. When the recorded sound is reproduced after shooting, noise may be included, or a sound other than a voice may be too large and hide the voice to be heard. Hence, there are proposed techniques of separating a desired sound component and an undesired sound component or removing a noise component.

For example, a beam former is known, which processes a plurality of microphone signals, enhances a desired sound, and extracts it using the directivity of the sound source.

As a method of removing wind noise mixed during shooting, there is also proposed a method of performing nonnegative matrix factorization for a plurality of audio signals parallelly picked up. In this method, highly correlated bases between the bases of one audio signal of the plurality of audio signals and those of another audio signal are extracted as noise components, and the noise components are reduced.

However, some digital cameras include only one microphone and cannot apply the above technique using a plurality of microphone signals to separate the desired sound or remove unsteady noise such as wind noise.

As a sound source separation technique for a single channel, there is known a method using nonnegative matrix factorization that is described in detail in literature 1. However, to reduce noise using signals separated by nonnegative matrix factorization, it is necessary to cluster the separated signals depending on whether they are noise signals or desired sound signals using a prelearned dictionary or the like.

Literature 1: Paris Smaragdis and Judith C. Brown "Non-Negative Matrix Factorization for Polyphonic Music Transcription" 2003 IEEE Workshop on Application of Signal Processing to Audio and Acoustics, Oct. 19-22, 2003

SUMMARY OF THE INVENTION

In one aspect, an audio signal processing apparatus comprising: an input unit configured to input an audio signal in which a first audio component and a second audio component are mixed; a transform unit configured to transform the audio signal into a time-frequency signal representing relation between time and signal frequency; a division unit configured to divide the time-frequency signal into a plurality of bands; a first factorization unit configured to factorize a time-frequency signal in a band, in which influence from the second audio component is small among the plurality of bands, into activity vectors composing a first activity matrix; and a second factorization unit configured to factorize the time-frequency signal transformed from the audio signal into activity vectors composing a second activity matrix using the first activity matrix as a teacher activity.

According to the aspect, it is possible to, without prelearning, separate at least one of a first audio component or a second audio component from an audio signal in which the first audio component and the second audio component are mixed.

Further features of the present invention will become apparent from the following description of exemplary embodiments with reference to the attached drawings.

DESCRIPTION OF THE EMBODIMENTS

Audio signal processing according to the embodiments of the present invention will now be described in detail with reference to the accompanying drawings. Note that the arrangements described in the embodiments are merely examples, and the present invention is not limited to the illustrated arrangements.

First Embodiment

[Arrangement of Apparatus]

Figure 1:
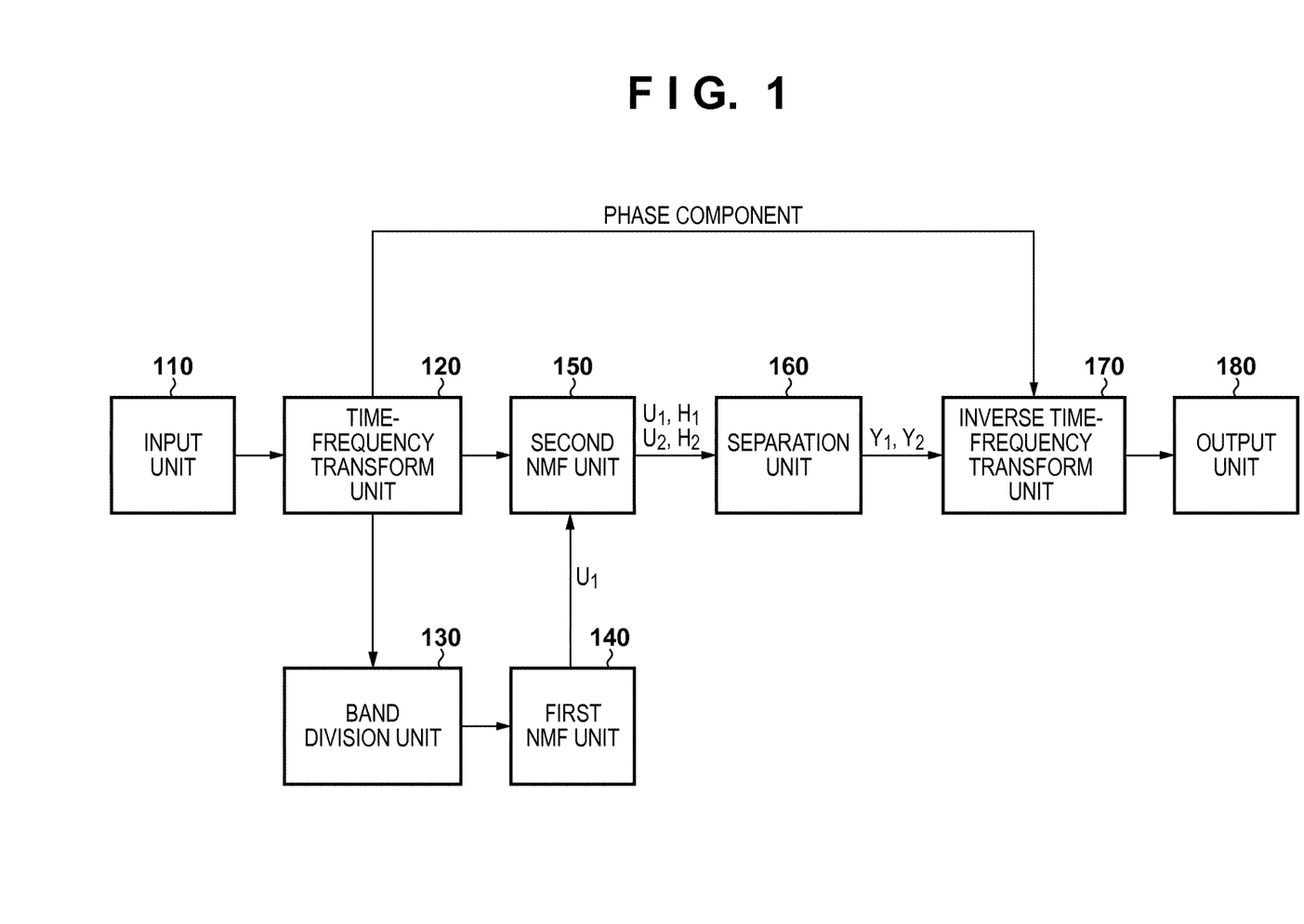
FIG. 1 is a block diagram showing the arrangement of an audio signal processing apparatus according to the first embodiment.

FIG. 1 shows the arrangement of an audio signal processing apparatus according to the first embodiment.

An input unit 110 inputs audio data or an analog signal that records an audio signal (to be referred to as a "mixed signal" hereinafter) in which a first audio component that is a desired sound and a second audio component that is an undesired sound are mixed. A description will be made below assuming that the first audio component is a sound such as a voice, and the second audio component is noise. When an analog signal is input, the input unit 110 converts it into a digital signal by analog/digital conversion (ADC).

A time-frequency transform unit 120 transforms (to be referred to as "time-frequency transform" hereinafter) the digital waveform signal of the audio data input from the input unit 110 into a time-frequency signal. Note that the waveform signal represents the relationship between the time and the signal amplitude, and the time-frequency signal represents the relationship between the time and the signal frequency. The time-frequency signal is, for example, a spectrogram, and a description will be made below assuming that the time-frequency transform unit 120 outputs a spectrogram. The spectrogram is data obtained by cutting out the waveform signal by passing through a window function while moving through a section of a predetermined time width and time-serially arranging frequency spectra generated by frequency-transforming the cutout signals using fast Fourier transform (FFT) or the like.

The time-frequency transform unit 120 outputs the spectrogram to a band division unit 130 and a second nonnegative matrix factorization (NMF) unit 150, and also outputs the phase component of the spectrogram to an inverse time-frequency transform unit 170.

Figure 2A:
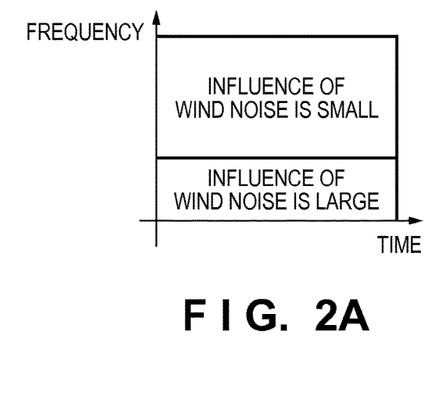
FIGS. 2A and 2B are views for explaining band division and extraction.
Figure 2B:
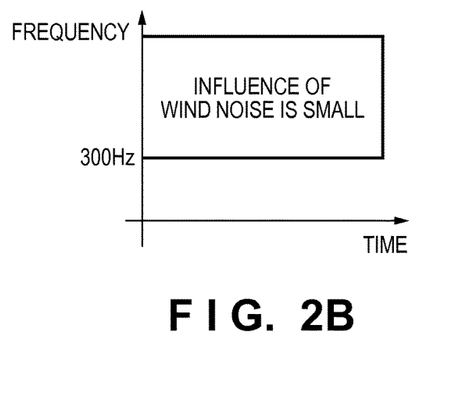

The band division unit 130 divides the band of the spectrogram and extracts a specific band. Band division and extraction will be described with reference to FIGS. 2A and 2B. FIG. 2A shows the spectrogram of the mixed signal. In general, the energy of wind noise concentrates to a low frequency range. Assume that the influence of wind noise is small in a frequency range of 300 Hz or more. In this case, the band division unit 130 divides the band at 300 Hz and extracts the high frequency range of 300 Hz or more where the influence of wind noise is small. As a result, only the spectrogram of the high frequency range is extracted, as shown in FIG. 2B.

A first nonnegative matrix factorization (NMF) unit 140 performs nonnegative matrix factorization (NMF) for the amplitude components of the spectrogram. That is, the band components of the spectrogram output from the band division unit 130 are factorized into components including a nonnegative basis matrix and a nonnegative activity matrix. The calculated activity matrix is output as a first activity matrix.

In NMF described in literature 1 above in detail, the nonnegative matrix (here, the amplitude components of the spectrogram) is approximated as the product of a nonnegative basis matrix and a nonnegative activity matrix. The basis matrix and the activity matrix are assumed to be nonnegative matrices hereinafter.

$$|Y| \approx HU \quad (1)$$

where
  Y is the spectrogram,
  H is the basis matrix, and
  U is the activity matrix.

In equation (1), when the spectrogram Y is an M×N matrix, the basis matrix H is an M×K matrix, and the activity matrix U is a K×N matrix. Note that K is called a basis number. The basis matrix H and the activity matrix U are calculated by iterative calculation.

The basis matrix H includes K basis vectors $h_n$ (basis spectra) and is represented by the following formula. The basis vector $h_n$ is assumed to be a nonnegative vector hereinafter.

$$H = [h_1, h_2, \ldots, h_K] \quad (2)$$

The activity matrix U includes K activity vectors $u_n$ (weight vectors) and is represented by the following formula. The activity vector $u_n$ is assumed to be a nonnegative vector hereinafter.

$$U = [u_1, u_2, \ldots, u_K]^T \quad (3)$$

where T is a transposed matrix.

Using the first activity matrix output from the first NMF unit 140 as a teacher activity, the second NMF unit 150 performs NMF for the spectrogram of the mixed signal output from the time-frequency transform unit 120. That is, letting $U_1$ be the first activity matrix, and $U_2$ be a second activity matrix added by the second NMF unit 150, the second NMF unit 150 calculates the activity matrix U as a combination of $U_1$ and $U_2$ represented by $$U = [U_1 U_2]^T \quad (4)$$

The number K of activity vectors $u_n$ of $U_1$ and $U_2$ is decided based on the sound to be separated, the type of noise, and the like. For example, in a mixed signal including noise and a voice, the voice components readily mix with the noise components as the number K of activity vectors $u_n$ of the noise increases. Hence, letting $K_1$ be the number of activity vectors $u_n$ of $U_1$, and $K_2$ be the number of activity vectors $u_n$ of $U_2$, $K_1 > K_2$ is preferably set.

The separation unit 160 receives the first activity matrix $U_1$, the second activity matrix $U_2$, and basis matrices $H_1$ and $H_2$ from the second NMF unit 150, and separates a spectrogram $Y_1$ of an audio component corresponding to $U_1$ and a spectrogram $Y_2$ of an audio component corresponding to $U_2$ by $$|Y_1| = H_1 U_1$$

$$|Y_2| = H_2 U_2 \quad (5)$$

where $H_1$ is the basis matrix corresponding to $U_1$, and
  $H_2$ is the basis matrix corresponding to $U_2$.
  $U_1$ is the activity matrix in a high frequency range where the influence of wind noise is small, and $Y_1$ is considered to represent a sound component. $Y_2$ is considered to represent a component different from the sound, that is, a noise component.

The inverse time-frequency transform unit 170 inversely transforms the spectrogram into a digital waveform signal by inverse transform of time-frequency transform. That is, the inverse time-frequency transform unit 170 generates a sound signal and a noise signal using the spectrogram $Y_1$ of the sound component and the spectrogram $Y_2$ of the noise component output from the separation unit 160 and the phase component of the spectrogram of the mixed signal calculated by the time-frequency transform unit 120.

An output unit 180 includes, for example, a digital/analog converter (DAC) and reproduces at least one of the sound signal or the noise signal input from the inverse time-frequency transform unit 170. Note that the output unit 180 may include an audio amplifier or a speaker. Alternatively, the output unit 180 may, for example, record the sound signal in a recording medium as digital sound data.

[Audio Signal Processing]

Figure 3:
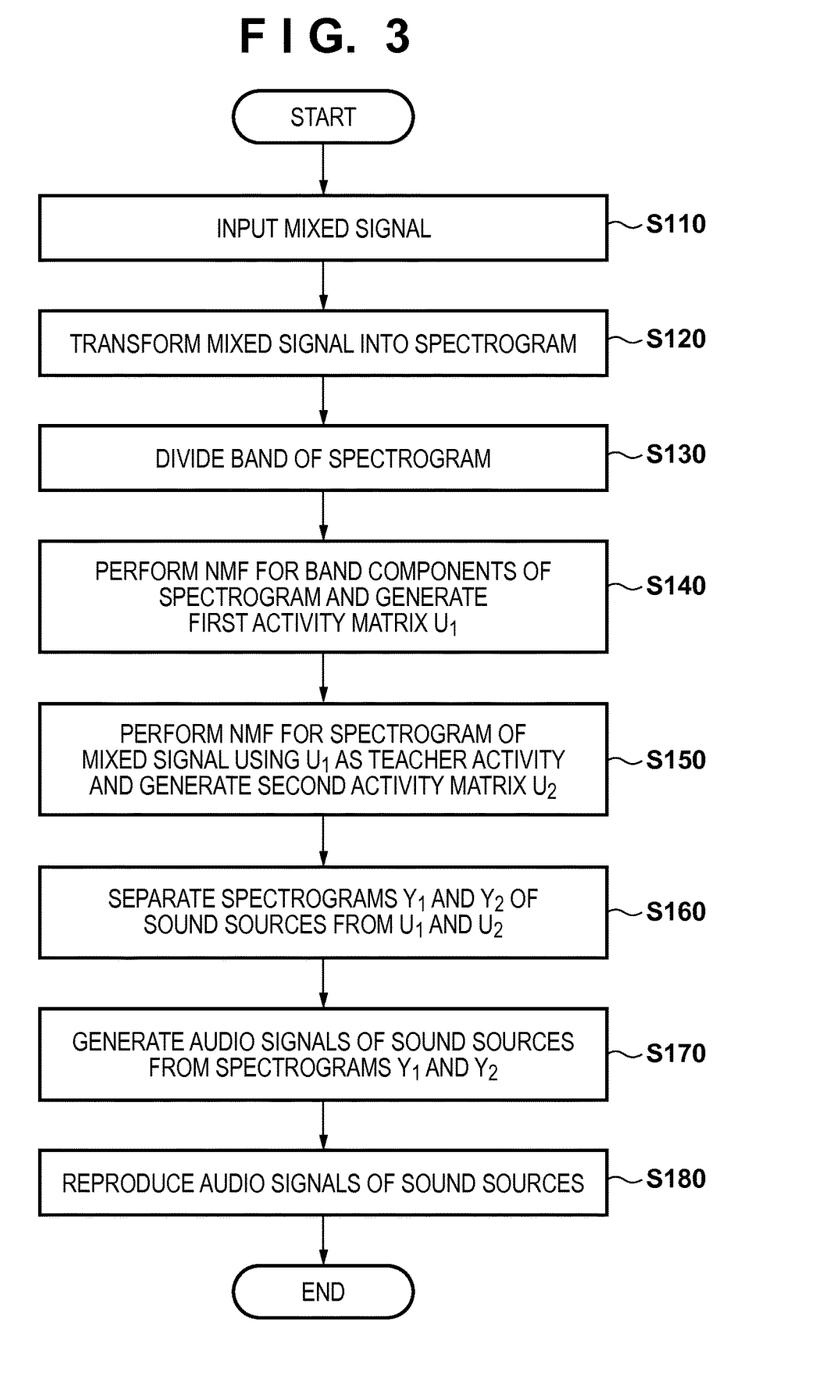
FIG. 3 is a flowchart for explaining audio signal processing of the audio signal processing apparatus according to the first embodiment.

Audio signal processing of the audio signal processing apparatus according to the first embodiment will be described with reference to the flowchart of FIG. 3.

The input unit 110 inputs a mixed signal (S110). The time-frequency transform unit 120 converts the mixed signal into a spectrogram (S120). The band division unit 130 divides the band of the spectrogram and extracts a specific band (for example, a high frequency range of 300 Hz or more) (S130). The first NMF unit 140 performs NMF for the band components of the spectrogram and generates the first activity matrix $U_1$ (S140).

Using the first activity matrix $U_1$ as a teacher activity, the second NMF unit 150 performs NMF for the spectrogram of the mixed signal input from the time-frequency transform unit 120 (S150). The second NMF unit 150 outputs the second activity matrix $U_2$ obtained by NMF and the basis matrix $H_2$ and the first activity matrix $U_1$ that is the teacher activity and the basis matrix $H_1$ to the separation unit 160.

The separation unit 160 separates the spectrograms $Y_1$ and $Y_2$ for the respective sound sources (S160). The inverse time-frequency transform unit 170 performs inverse time-frequency transform of the spectrograms $Y_1$ and $Y_2$, and generates the audio signals of the sound sources (S170). The output unit 180 reproduces the audio signals of the sound sources (S180).

In this way, the teacher activity is learned in a band where the second audio component (for example, noise that is an undesired sound) other than the first audio component (for example, voice that is a desired sound) to be separated is not included or a band where the influence of the second audio component is small. NMF is performed for all bands using the teacher activity. This makes it possible to separate the audio signal of the first audio component (for example, voice) and the audio signal of the second audio component (for example, noise) from the mixed signal without clustering.

Modifications of First Embodiment

Figure 4:
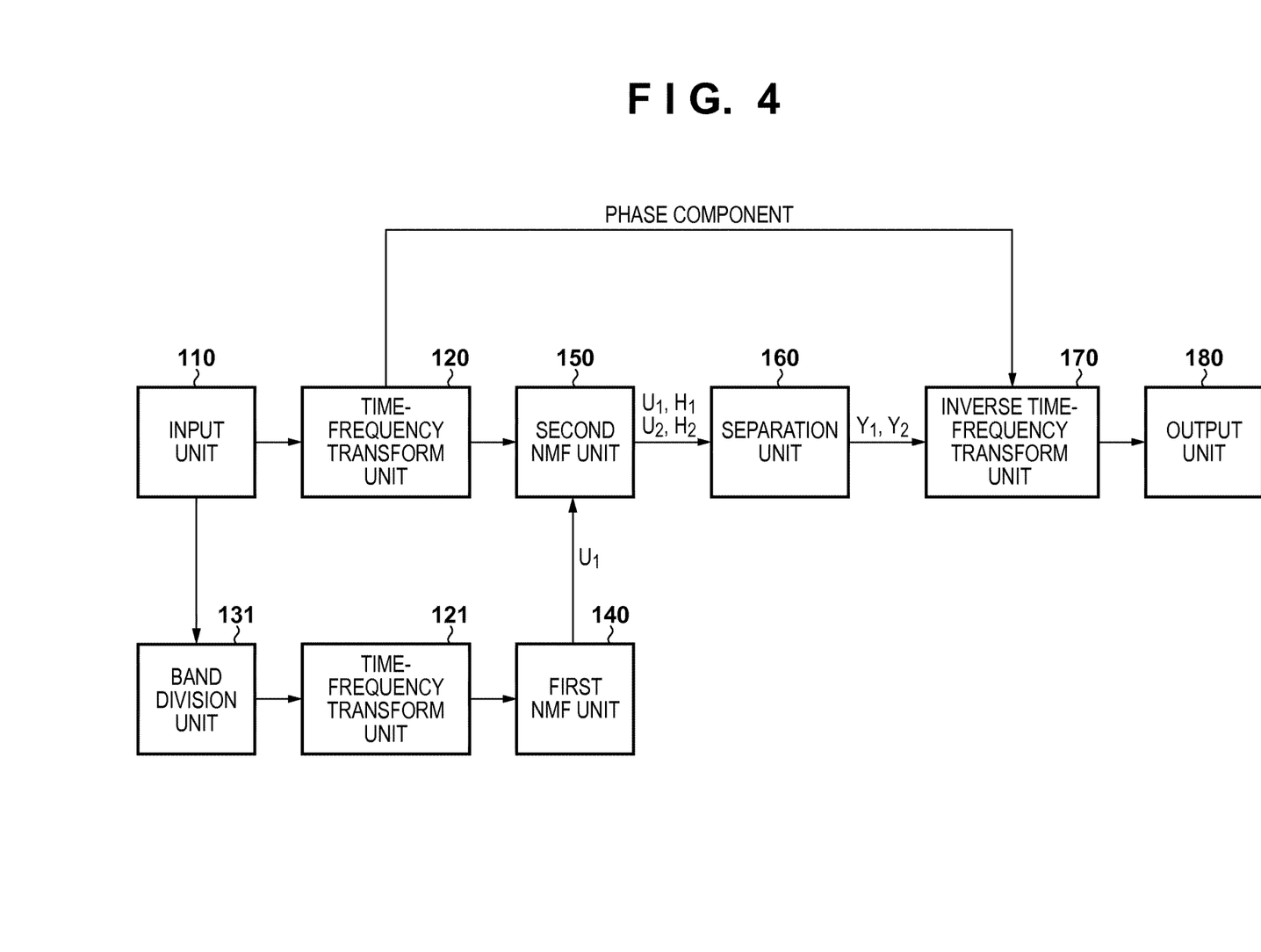
FIG. 4 is a block diagram showing the first modification of the audio signal processing apparatus.

An example has been described above in which time-frequency transform and band division are performed in this order. However, the order of time-frequency transform and band division may be reversed. FIG. 4 is a block diagram showing the first modification of the audio signal processing apparatus.

In the arrangement shown in FIG. 4, a band division unit 131 divides the band of an input signal using a high-pass filter, a low-pass filter, or a bandpass filter. The time-frequency transform unit 120 performs time-frequency transform of the input signal. A time-frequency transform unit 121 performs time-frequency transform of the signal of the specific band extracted by the band division unit 131. The rest of the arrangement is the same as in the first embodiment.

An example has been described above in which the second NMF unit 150 performs NMF for the output of the time-frequency transform unit 120. However, the second NMF unit 150 can perform NMF for a band signal B in a frequency range other than a band signal A output from the band division unit 130. For example, when separating noise and a voice, a band signal for which the influence of noise is small corresponds to the band signal A, and a band signal in which noise and the voice mix corresponds to the band signal B.

Figure 5:
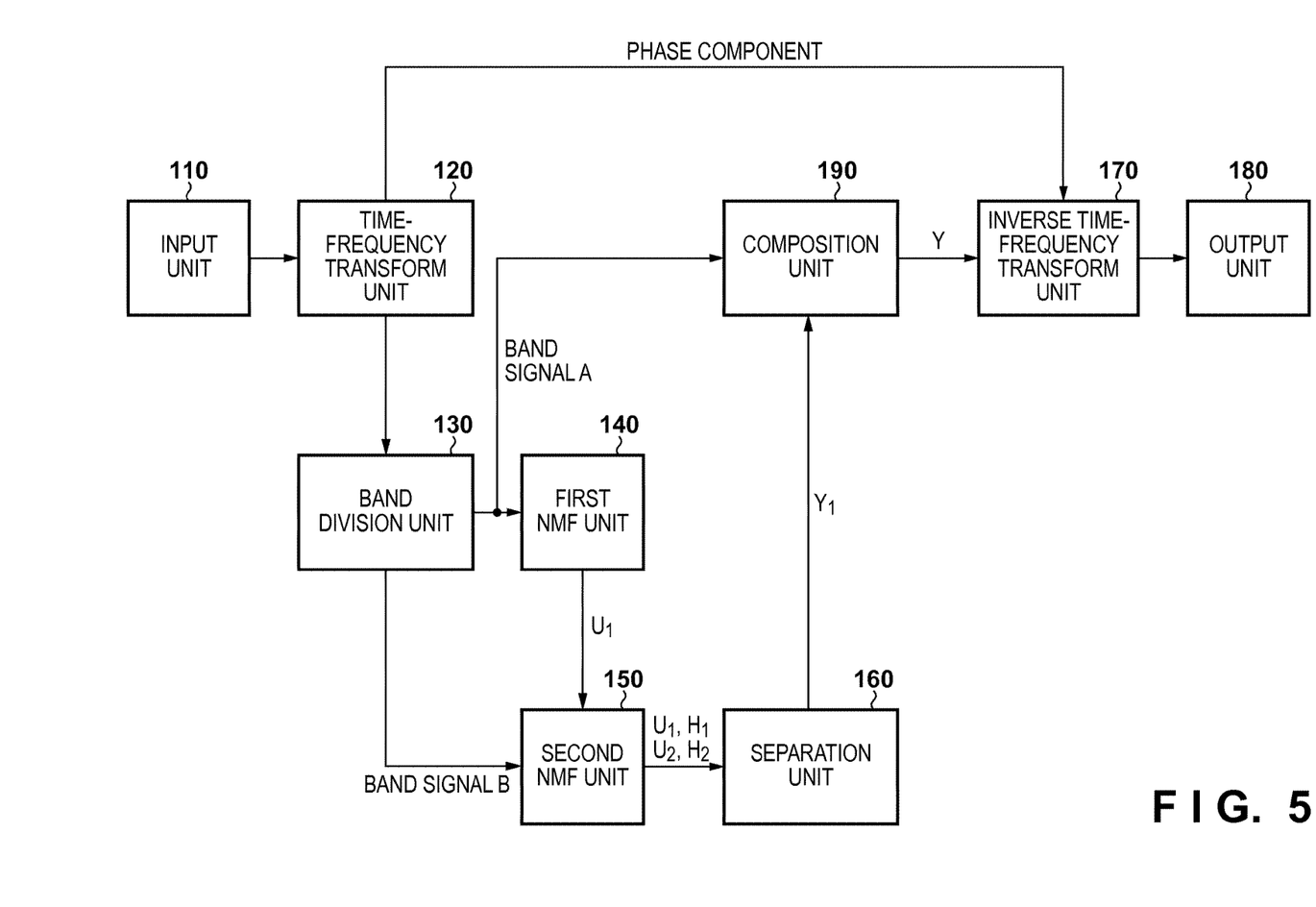
FIG. 5 is a block diagram showing the second modification of the audio signal processing apparatus.

FIG. 5 is a block diagram showing the second modification of the audio signal processing apparatus. The band division unit 130 outputs the band signal A and the band signal B. The first NMF unit 140 outputs the activity matrix $U_1$ obtained by performing NMF for the band signal A. The second NMF unit 150 performs NMF for the band signal B using the activity matrix $U_1$ as the teacher activity.

The separation unit 160 separates the spectrograms $Y_1$ and $Y_2$ of the band signal B. That is, the band signal B is separated into the spectrogram $Y_2$ of the noise and the spectrogram $Y_1$ of the voice. A composition unit 190 composites the spectrogram of the band signal A for which the influence of noise is small and the spectrogram $Y_1$ of the voice separated by the separation unit 160. The voice component including no noise component can be separated in this way.

An example has been described above in which separated signals (sound signal and noise signal) are generated from the spectrograms $Y_1$ and $Y_2$ separated by the separation unit 160. However, sound source separation may be done by generating a filter that separates the mixed signal using the output of the separation unit 160 and filtering the input signal.

Figure 6:
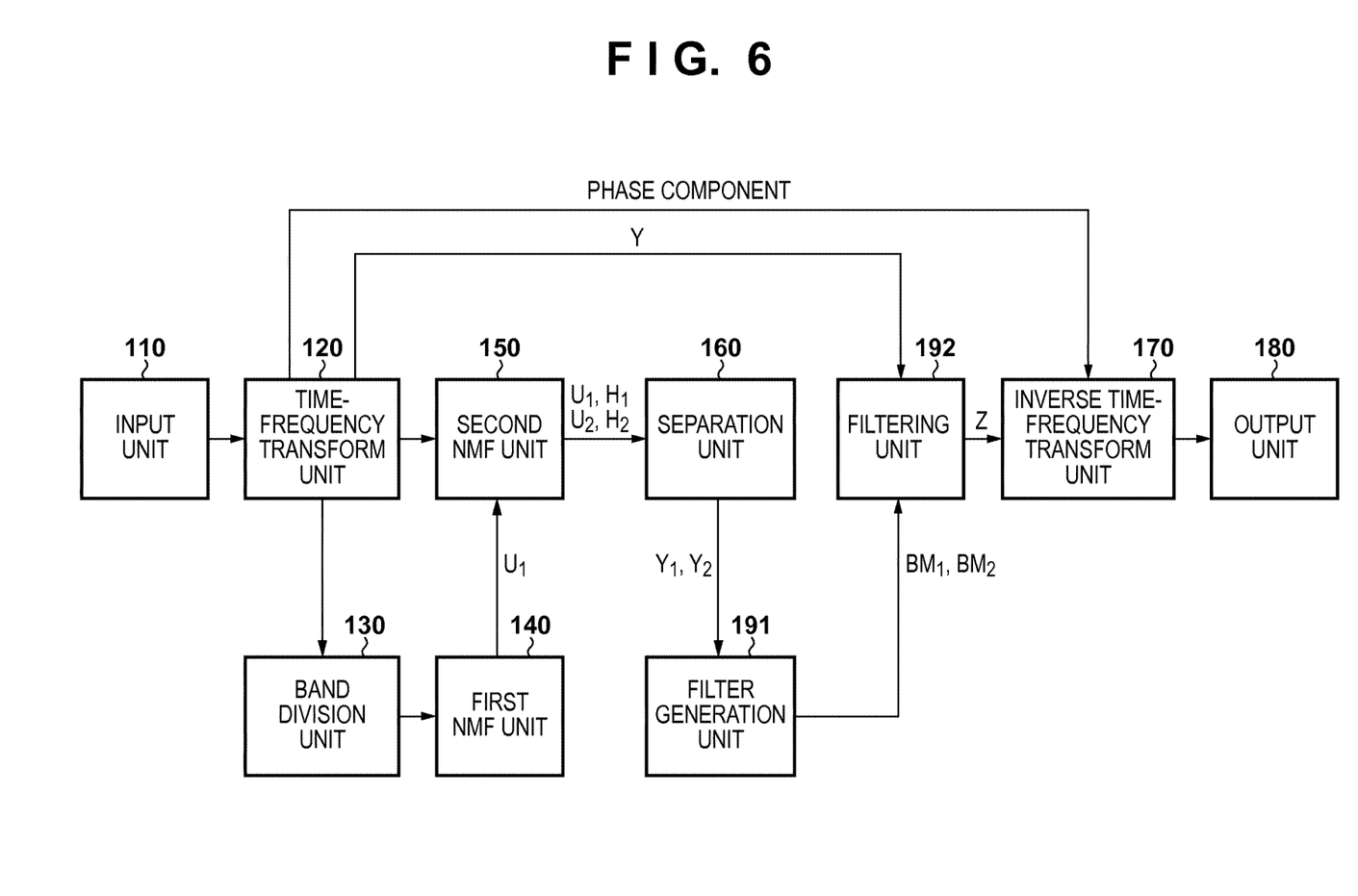
FIG. 6 is a block diagram showing the third modification of the audio signal processing apparatus.

FIG. 6 is a block diagram showing the third modification of the audio signal processing apparatus. For example, when separating a signal into two components, based on the spectrograms $Y_1$ and $Y_2$ output from the separation unit 160, a filter generation unit 191 generates, as a filter, binary masks $BM_1$ and $BM_2$ represented by if $(|Y_1|_{t,f} > |Y_2|_{t,f})$ {

$BM_1$='1';

$BM_2$='0';

} else {

$BM_1$='0';

$BM_2$='1';

}               (6)

where t is the time frame of the spectrogram, and
f is the frequency bin of the spectrogram.

A filtering unit 192 applies the generated binary masks to the spectrogram of the mixed signal by $$|Z_n|_{t,f} = |Y|_{t,f} * BM_{n,t,f} \qquad (7)$$

where Y is the spectrogram of the mixed signal,
Z is the spectrogram to be output,
n=1, 2, and
* represents convolution operation.

Note that the filter generated by the filter generation unit 191 may be, for example, a Wiener filter, and spectrum subtraction from the mixed signal may be done using the spectrogram of the separated noise component. FIG. 6 shows an arrangement that adds the filter generation unit 191 and the filtering unit 192 to the arrangement shown in FIG. 1. The same processing as described above can be implemented even by an arrangement that adds the filter generation unit 191 and the filtering unit 192 to the arrangement shown in FIG. 4.

An example has been described above in which the input unit 110 inputs audio data that records the mixed signal. However, the input unit 110 may input a mixed signal picked up by a microphone and output a digital signal obtained by converting the input mixed signal by ADC. In this case, the series of processes is performed at a predetermined time interval.

An example has been described above in which the time-frequency signal is used as the spectrogram. The time-frequency signal may be acquired using time-frequency transform such as wavelet transform. In this case, the inverse time-frequency transform unit 170 performs inverse transform such as inverse wavelet transform.

An example has been described above in which the band division unit 130 divides the band into two parts. If the mixed signal includes three or more sound sources, and the sound sources have strong components in different bands, the plurality of bands may be extracted. In this case, the first NMF unit 140 performs NMF for each extracted band and acquires the teacher activity of each band.

An example has been described above in which since the mixed signal is assumed to include wind noise and a voice, the component in the high frequency range where the influence of wind noise is small is extracted. However, if the component included the mixed signal includes is the sound of a musical instrument in a different range, for example, a band where the component of a musical instrument in a low range is included but the component of a musical instrument in a high range is not included may be extracted.

An example has been described above in which the high frequency range of 300 Hz or more where the influence of wind noise is small is extracted. However, since a very high frequency range includes few voice components, an upper limit may be set for the band to be extracted. For example, a band from 300 Hz to 2,000 Hz including major voice bands is extracted. In addition, the influence of wind noise depends on the microphone, the structure around it, and the like. Hence, the frequency of band division is preferably set for each device used for recording.

An example in which NMF is performed has been described above. However, the processing need only output components including nonnegative basis matrix and activity matrix. For example, nonnegative matrix factor deconvolution (NMFD, Japanese Patent Laid-Open No. 2005-258440) or complex nonnegative matrix factorization (complex NMF, see literature 2) may be used. For example, when using complex NMF, a phase component obtained by the complex NMF is preferably used as the phase component used by the inverse time-frequency transform unit 170.

Literature 2: Kameoka Hirokazu, Ono Nobutaka, and Kashino Kunio "Complex NMF: A new sparse signal representation and basis set optimization", Proc. of ASJ Meeting, 2-8-13, pp. 657-660, September, 2008.

An example has been described above in which the second NMF unit 150 uses the first activity matrix $U_1$ as the teacher activity. However, the second NMF unit 150 may use bases calculated by the first NMF unit 140 as some bases (partial teacher bases).

The audio signal processing apparatuses shown in FIGS. 1 and 4 to 6 can be implemented by supplying a program that executes the audio signal processing of the embodiment to a computer through a recording medium.

Second Embodiment

Audio signal processing according to the second embodiment of the present invention will be described below. Note that the same reference numerals as in the first embodiment denote the same parts in the second embodiment, and a detailed description thereof will be omitted.

Figure 7:
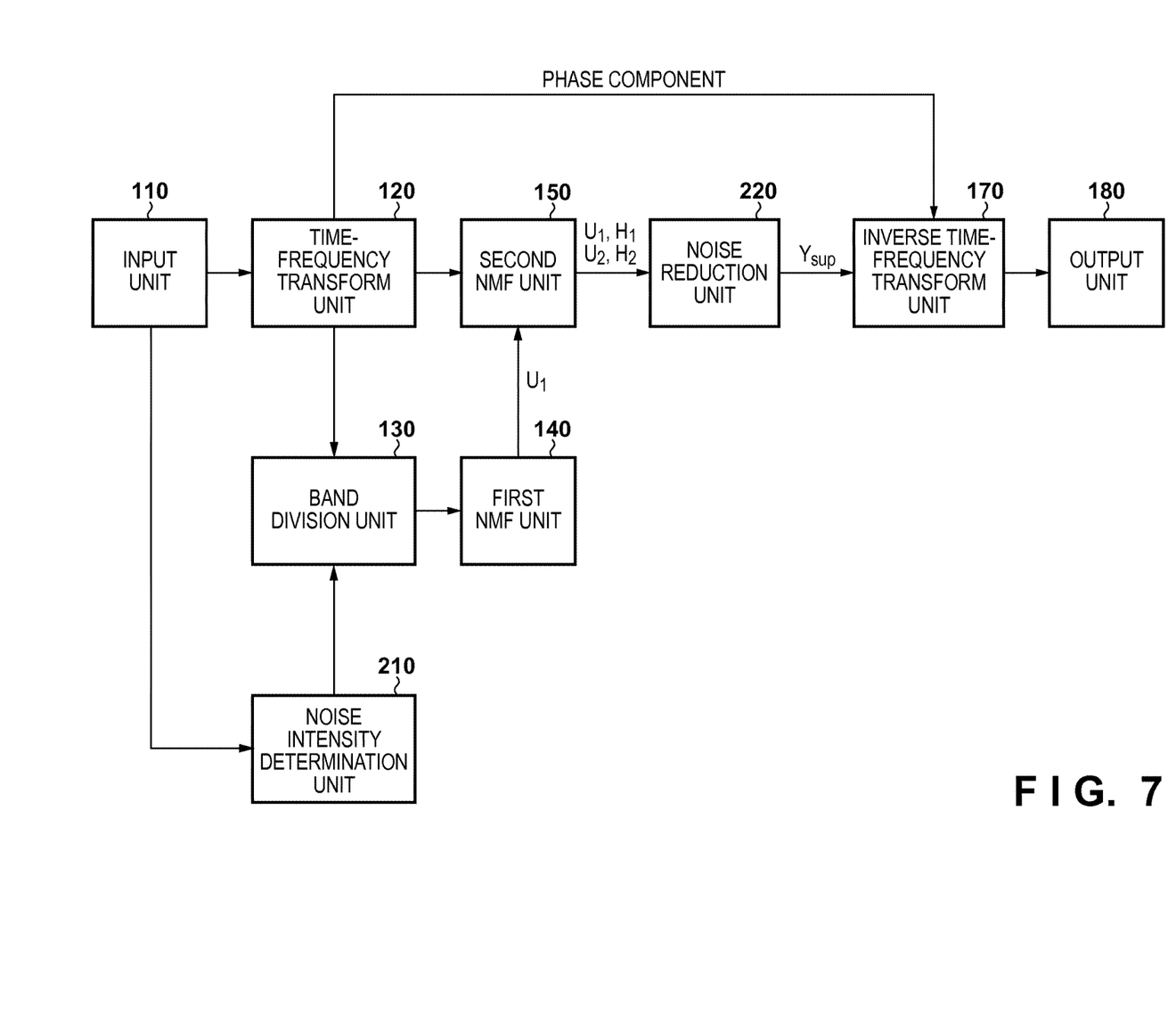
FIG. 7 is a block diagram showing the arrangement of an audio signal processing apparatus according to the second embodiment.

FIG. 7 is a block diagram showing the arrangement of an audio signal processing apparatus according to the second embodiment.

A noise intensity determination unit 210 receives a mixed signal from an input unit 110, determines the intensity of wind noise, and adjusts the division frequency of a band division unit 130 in accordance with the intensity. For example, the noise intensity determination unit 210 has a function of detecting a voice section, and determines the wind noise intensity from the signal strength in a non-voice section. For example, when wind noise is strong, the division frequency is adjusted to a higher frequency. When wind noise is weak, the division frequency is adjusted to a lower frequency.

Letting $H_1$ and $H_2$ be basis matrices corresponding to a first activity matrix $U_1$ and a second activity matrix $U_2$ output from a second NMF unit 150, a noise reduction unit 220 generates a spectrogram $Y_{sup}$ after noise reduction by performing processing represented by $$|Y_{sup}| = H_1 U_1 + \alpha H_2 U_2 \qquad (8)$$

where $\alpha$ is a reduction coefficient ($0 \leq \alpha < 1$).

The noise reduction unit 220 adds a noise component $H_2 U_2$ reduced by the reduction coefficient $\alpha$ to a sound component $H_1 U_1$, thereby reducing noise and outputting the spectrogram $Y_{sup}$ after noise reduction.

Figure 8:
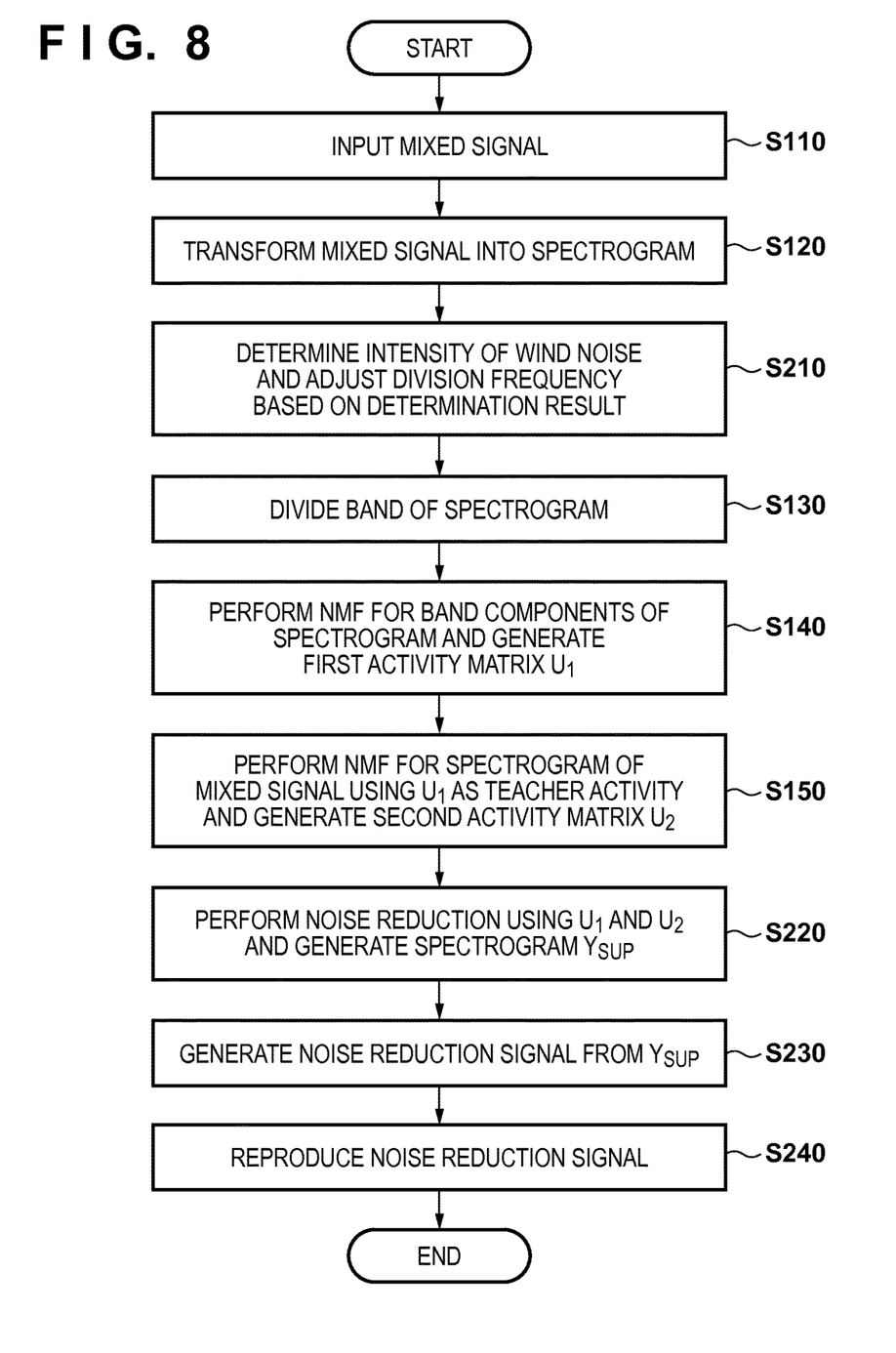
FIG. 8 is a flowchart for explaining audio signal processing of the audio signal processing apparatus according to the second embodiment.

Audio signal processing of the audio signal processing apparatus according to the second embodiment will be described with reference to the flowchart of FIG. 8.

When the mixed signal is input (S110) and converted into a spectrogram (S120), the noise intensity determination unit 210 determines the intensity of wind noise and adjusts the division frequency of the band division unit 130 based on the determination result (S210).

After that, band division of the spectrogram (S130), NMF of the band components of the spectrogram (S140), and NMF of the spectrogram of the mixed signal (S150) are executed, as in the first embodiment.

Next, the noise reduction unit 220 performs noise reduction using the first activity matrix $U_1$ and the second activity matrix $U_2$ (S220). An inverse time-frequency transform unit 170 generates a noise reduction signal from the spectrogram $Y_{sup}$ after noise reduction and the phase component of the spectrogram of the mixed signal (S230). An output unit 180 reproduces (or records) the noise reduction signal (S240).

In this way, when the frequency band of major components is limited in noise, the teacher activity is learned in a frequency band where the influence of noise is small. A noise reduction signal in which the noise components of the mixed signal are reduced can thus be generated without clustering.

Modifications of Second Embodiment

An example has been described above in which the noise intensity determination unit 210 determines the wind noise intensity from the signal in the non-voice section. However, the wind noise intensity may be determined from the ratio of the signal amplitude (or power) in the low frequency range to that in the high frequency range.

An example has been described above in which the noise intensity determination unit 210 determines the wind noise intensity from the mixed signal. However, the input unit 110 may input a set of the mixed signal and a signal that records the wind strength at the time of recording of the mixed signal, and the noise intensity determination unit 210 may determine the wind noise intensity from the wind strength signal. The wind strength signal is, for example, data that records the wind velocity near the microphone upon recording and represents a time-rate change in the wind velocity.

An example has been described above in which the noise reduction unit 220 reduces noise by multiplying the wind noise component $H_2 U_2$ by the reduction coefficient $\alpha$. However, the noise component may be processed on a band basis by performing filtering using a high-pass filter, a band-stop filter, or the like only for the wind noise component $H_2 U_2$ and then added to the voice component.

The noise reduction unit 220 may use spectrum subtraction. That is, the noise component is reduced by performing spectrum subtraction of the wind noise component $H_2 U_2$ from the spectrogram of the mixed signal.

The wind noise component $H_2 U_2$ rarely includes the band components of the signal output from the band division unit 130, that is, the components in the high frequency range. Hence, the second NMF unit 150 may perform NMF by setting a constraint to prohibit the basis matrix $H_2$ from including the components of the band of the signal output from the band division unit 130.

Third Embodiment

Audio signal processing according to the third embodiment of the present invention will be described below. Note that the same reference numerals as in the first and second embodiments denote the same parts in the third embodiment, and a detailed description thereof will be omitted.

Figure 9:
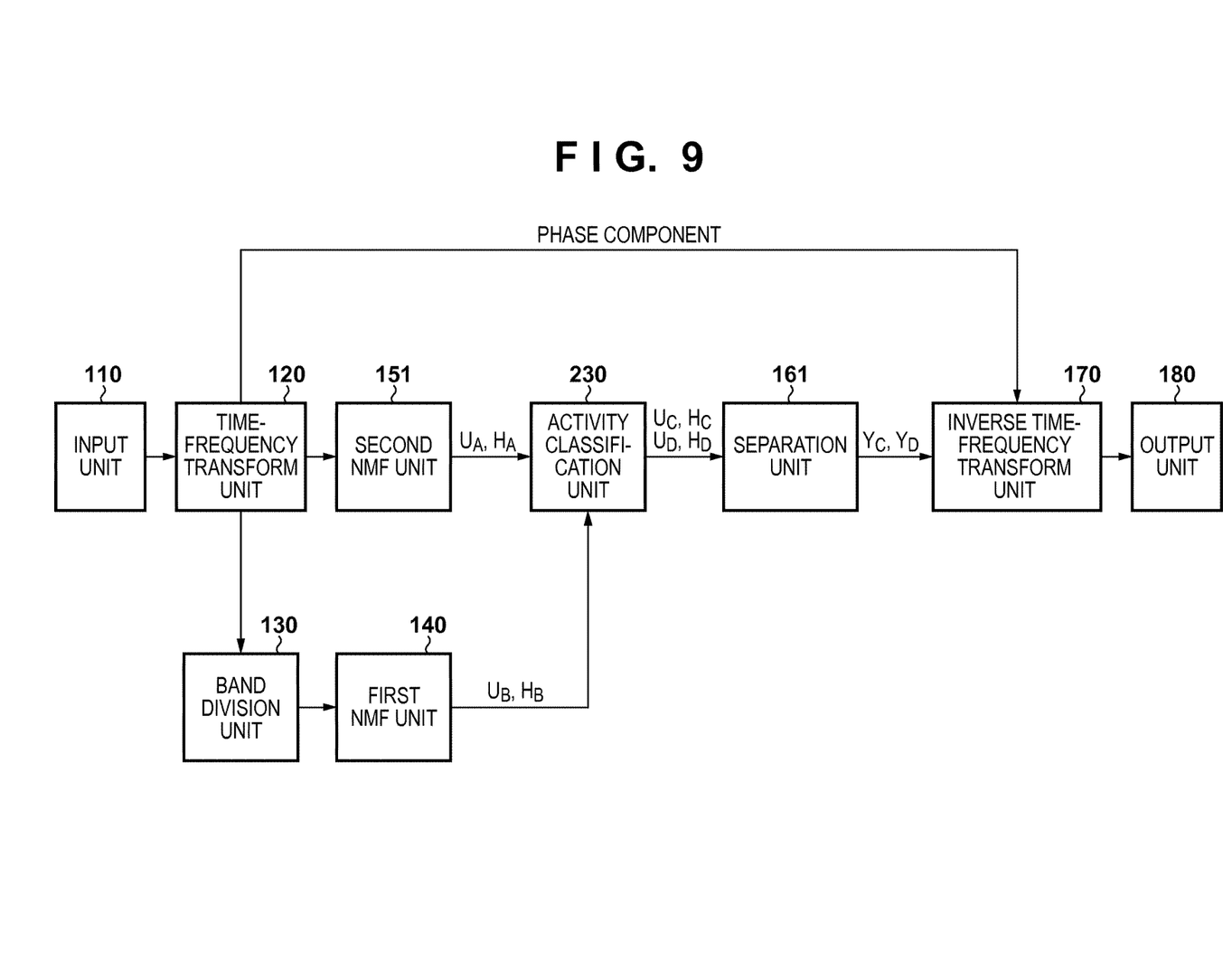
FIG. 9 is a block diagram showing the arrangement of an audio signal processing apparatus according to the third embodiment.

FIG. 9 is a block diagram showing the arrangement of an audio signal processing apparatus according to the third embodiment.

A second NMF unit 151 according to the third embodiment performs NMF for the spectrogram of a mixed signal without using a teacher signal, unlike the second NMF unit 150 according to the first embodiment. The second NMF unit 151 calculates an activity matrix $U_A$ including activity vectors u in a number m larger than a number n of activity vectors u of an activity matrix $U_B$ calculated by a first NMF unit 140. The second NMF unit 151 outputs the calculated activity matrix $U_A$ and a basis matrix $H_A$.

An activity classification unit 230 receives the activity matrix $U_A$ and the basis matrix $H_A$ from the second NMF unit 151 and the activity matrix $U_B$ and a basis matrix $H_B$ from the first NMF unit 140, and divides the activity matrix $U_A$ into two activity matrices.

For example, the activity classification unit 230 correlates activity vectors $a_m$ included in the activity matrix $U_A$ and activity vectors $b_n$ included in the activity matrix $U_B$. The activity classification unit 230 then creates an activity matrix $U_C$ from the activity vectors $a_m$ having a high correlation with the activity vectors $b_n$. The activity classification unit 230 also creates an activity matrix $U_D$ from the activity vectors $a_m$ having a low correlation (or no correlation) with the activity vectors $b_n$. The activity matrix $U_A$ is thus classified into two activity matrices. In other words, the activity vectors $a_m$ included in the activity matrix $U_A$ are classified into two sets (activity matrices $U_C$ and $U_D$). The activity classification unit 230 outputs the activity matrices $U_C$ and $U_D$ after classification and corresponding basis matrices $H_C$ and $H_D$.

Based on the input activity matrices $U_C$ and $U_D$ and basis matrices $H_C$ and $H_D$, a separation unit 161 separates a spectrogram Y of the mixed signal by $|Y_C|=H_C U_C$ $|Y_D|=H_D U_D$ (9)

for $|Y|=|Y_C|+|Y_D|$

In this way, the teacher activity is learned in a band where the second audio component (for example, noise) other than the first audio component (for example, voice) to be separated is not included or a band where the influence of the second audio component is small. Then, clustering is performed using the signal of the teacher activity. This makes it possible to separate the mixed signal into a signal $Y_C$ of the first audio component (for example, voice) and a signal $Y_D$ of the second audio component (for example, noise).

Figure 10:
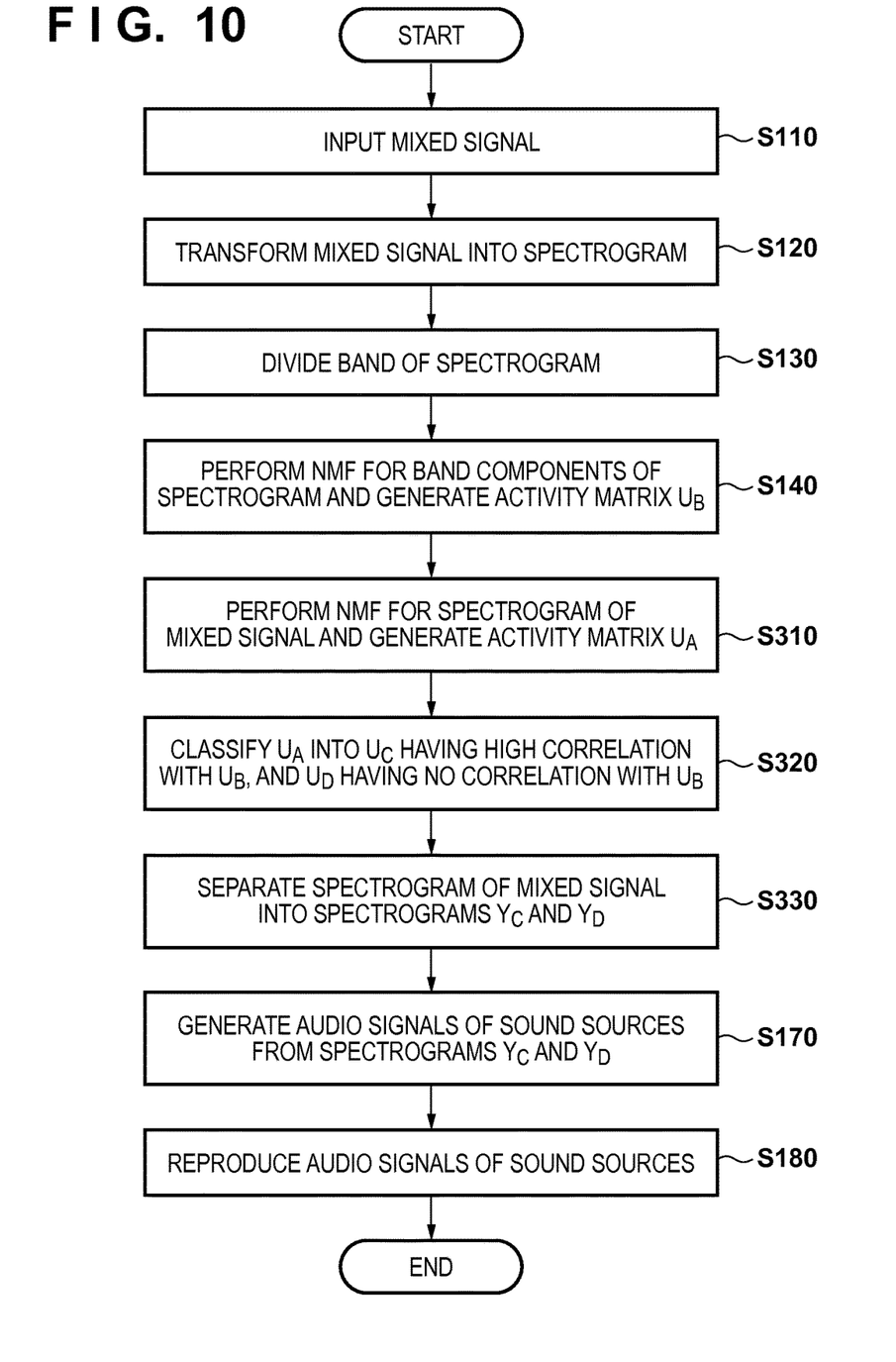
FIG. 10 is a flowchart for explaining audio signal processing of the audio signal processing apparatus according to the third embodiment.

Audio signal processing of the audio signal processing apparatus according to the third embodiment will be described with reference to the flowchart of FIG. 10.

Input of the mixed signal (S110), transform of the mixed signal into a spectrogram (S120), band division of the spectrogram (S130), and NMF of the band components of the spectrogram (S140) are executed, as in the first embodiment.

The second NMF unit 151 performs NMF for the spectrogram of the mixed signal and outputs the activity matrix $U_A$ and the basis matrix $H_A$ (S310).

The activity classification unit 230 classifies the activity matrix $U_A$ into the activity matrix $U_C$ having a high correlation with the activity matrix $U_B$ and the activity matrix $U_D$ having no correlation (S320).

The separation unit 161 separates the spectrogram of the mixed signal into $Y_C$ and $Y_D$ based on the activity matrices $U_C$ and $U_D$ and the basis matrices $H_C$ and $H_D$ (S330).

After that, the audio signals of the respective sound sources are generated from the spectrograms $Y_C$ and $Y_D$ by inverse time-frequency transform (S170), and the audio signals of the sound sources are reproduced (S180), as in the first embodiment.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-008074 filed Jan. 20, 2014 which is hereby incorporated by reference herein in its entirety.

What is claimed is:

1. An audio signal processing apparatus comprising:
   one or more hardware processors; and
   a memory having stored thereon instructions, which, when executed by the one or more hardware processors, cause the audio signal processing apparatus to:
     input an audio signal in which a first audio component and a second audio component are mixed;
     transform the audio signal into a time-frequency signal representing relation between time and signal frequency;

divide the time-frequency signal into a plurality of frequency bands;

factorize a time-frequency signal in a frequency band, in which influence from the second audio component is small among the plurality of frequency bands, into activity vectors composing a first activity matrix;

factorize the time-frequency signal transformed from the audio signal into activity vectors composing a second activity matrix using the first activity matrix as a teacher activity; and separate the first audio component and the second audio component from the audio signal, using the activity vectors composing the second activity matrix.

2. The apparatus according to claim 1, wherein the instructions, when executed by the one or more hardware processors, further cause the audio signal processing apparatus to separate a time-frequency signal of the first audio component and a time-frequency signal of the second audio component using the first and second activity matrices.

3. The apparatus according to claim 2,
wherein the instructions, when executed by the one or more hardware processors, further cause the audio signal processing apparatus to generate a filter based on the time-frequency signal of the first audio component and the time-frequency signal of the second audio component; and perform filtering of the time-frequency signal transformed from the audio signal using the generated filter.

4. An audio signal processing apparatus comprising:
one or more hardware processors; and
a memory having stored thereon instructions, which, when executed by the one or more hardware processors, cause the audio signal processing apparatus to:
input an audio signal in which a first audio component and a second audio component are mixed;
divide the audio signal into a plurality of frequency bands;
transform an audio signal in a frequency band, in which influence from the second audio component is small among the plurality of frequency bands, into a first time-frequency signal;
transform the input audio signal into a second time-frequency signal, wherein the first and second time frequency signals represent relation between time and signal frequency respectively;
factorize the first time-frequency signal into activity vectors composing a first activity matrix;
factorize the second time-frequency signal into activity vectors composing a second activity matrix using the first activity matrix as a teacher activity; and
separate the first audio component and the second audio component from the audio signal, using the activity vectors composing the second activity matrix.

5. An audio signal processing apparatus comprising:
one or more hardware processors; and
a memory having stored thereon instructions, which, when executed by the one or more hardware processors, cause the audio signal processing apparatus to:
input an audio signal in which a first audio component and a second audio component are mixed;
transform the audio signal into a time-frequency signal representing relation between time and signal frequency;
determine intensity of the second audio component contained in the audio signal, wherein the second audio component includes wind noise;

divide the time-frequency signal into a plurality of frequency bands according to the intensity of the second audio component;

factorize a time-frequency signal in a frequency band, in which influence from the second audio component is small among the plurality of frequency bands, into activity vectors composing a first activity matrix;

factorize the time-frequency signal transformed from the audio signal into activity vectors composing a second activity matrix using the first activity matrix as a teacher activity; and separate the first audio component and the second audio component from the audio signal, using the activity vectors composing the second activity matrix.

6. The apparatus according to claim 5, wherein the instructions, when executed by the one or more hardware processors, further cause the audio signal processing apparatus to generate a time-frequency signal, in which the second audio component is reduced, using the first and second activity matrices.

7. An audio signal processing apparatus comprising:
one or more hardware processors; and
a memory having stored thereon instructions, which, when executed by the one or more hardware processors, cause the audio signal processing apparatus to:
input an audio signal in which a first audio component and a second audio component are mixed;
transform the audio signal into a time-frequency signal representing relation between time and signal frequency;
divide the time-frequency signal into a plurality of frequency bands;
factorize a time-frequency signal in a frequency band, in which influence from the second audio component is small among the plurality of frequency bands, into first activity vectors composing a first activity matrix;
factorize the time-frequency signal transformed from the audio signal into second activity vectors composing a second activity matrix;
classify the second activity matrix into a third activity matrix and a fourth activity matrix based on correlation between the first and second activity; and
separate the first audio component and the second audio component from the audio signal, using the third activity matrix and the fourth activity matrix.

8. The apparatus according to claim 7, wherein the third activity matrix contains the second activity vectors having a high correlation with the first activity vectors, and the fourth activity matrix contains the second activity vectors having a small correlation with the first activity vectors.

9. The apparatus according to claim 7, wherein a number of the second activity vectors is larger than a number of the first activity vectors.

10. The apparatus according to claim 7, wherein the instructions, when executed by the one or more hardware processors, further cause the audio signal processing apparatus to separate a time-frequency signal of the first audio component and a time-frequency signal of the second audio component using the third and fourth activity matrices.

11. The apparatus according to claim 1, wherein the instructions, when executed by the one or more hardware processors, further cause the audio signal processing apparatus to inversely transform the time-frequency signal into an audio signal.

12. The apparatus according to claim 1, wherein the first audio component comprises a signal of a desired sound, and the second audio component comprises a signal of an undesired sound or a noise.

13. A method of processing an audio signal comprising: using a processor to perform steps of:
inputting an audio signal in which a first audio component and a second audio component are mixed;
transforming the audio signal into a time-frequency signal representing relation between time and signal frequency;
dividing the time-frequency signal into a plurality of frequency bands;
factorizing a time-frequency signal in a frequency band, in which influence from the second audio component is small among the plurality of frequency bands, into activity vectors composing a first activity matrix;
factorizing the time-frequency signal transformed from the audio signal into activity vectors composing a second activity matrix using the first activity matrix as a teacher activity; and
separating the first audio component and the second audio component from the audio signal, using the activity vectors composing the second activity matrix.

14. A method of processing an audio signal comprising: using a processor to perform steps of:
inputting an audio signal in which a first audio component and a second audio component are mixed;
dividing the audio signal into a plurality of frequency bands;
transforming an audio signal in a frequency band, in which influence from the second audio component is small among the plurality of frequency bands, into a first time-frequency signal;
transforming the input audio signal into a second time-frequency signal, wherein the first and second time frequency signals represent relation between time and signal frequency respectively;
factorizing the first time-frequency signal into activity vectors composing a first activity matrix;
factorizing the second time-frequency signal into activity vectors composing a second activity matrix using the first activity matrix as a teacher activity; and
separating the first audio component and the second audio component from the audio signal, using the activity vectors composing the second activity matrix.

15. A method of processing an audio signal comprising: using a processor to perform steps of:
inputting an audio signal in which a first audio component and a second audio component are mixed;
transforming the audio signal into a time-frequency signal representing relation between time and signal frequency;
determining intensity of the second audio component contained in the audio signal;
dividing the time-frequency signal into a plurality of frequency bands according to the intensity of the second audio component, wherein the second audio component includes wind noise;
factorizing a time-frequency signal in a frequency band, in which influence from the second audio component is small among the plurality of frequency bands, into activity vectors composing a first activity matrix;
factorizing the time-frequency signal transformed from the audio signal into activity vectors composing a second activity matrix using the first activity matrix as a teacher activity; and
separating the first audio component and the second audio component from the audio signal, using the activity vectors composing the second activity matrix.

16. A method of processing an audio signal comprising: using a processor to perform steps of:
inputting an audio signal in which a first audio component and a second audio component are mixed;
transforming the audio signal into a time-frequency signal representing relation between time and signal frequency;
dividing the time-frequency signal into a plurality of frequency bands;
factorizing a time-frequency signal in a frequency band, in which influence from the second audio component is small among the plurality of frequency bands, into first activity vectors composing a first activity matrix;
factorizing the time-frequency signal transformed from the audio signal into second activity vectors composing a second activity matrix;
classifying the second activity matrix into a third activity matrix and a fourth activity matrix based on correlation between the first and second activity vectors; and
separating the first audio component and the second audio component from the audio signal, using the third activity matrix and the fourth activity matrix.

17. A non-transitory computer readable medium storing a computer-executable program for causing a computer to perform a method of processing an audio signal, the method comprising:
inputting an audio signal in which a first audio component and a second audio component are mixed;
transforming the audio signal into a time-frequency signal representing relation between time and signal frequency;
dividing the time-frequency signal into a plurality of frequency bands;
factorizing a time-frequency signal in a frequency band, in which influence from the second audio component is small among the plurality of frequency bands, into activity vectors composing a first activity matrix;
factorizing the time-frequency signal transformed from the audio signal into activity vectors composing a second activity matrix using the first activity matrix as a teacher activity; and
separating the first audio component and the second audio component from the audio signal, using the activity vectors composing the second activity matrix.

18. A non-transitory computer readable medium storing a computer-executable program for causing a computer to perform a method of processing an audio signal, the method comprising:
inputting an audio signal in which a first audio component and a second audio component are mixed;
dividing the audio signal into a plurality of frequency bands;
transforming an audio signal in a frequency band, in which influence from the second audio component is small among the plurality of frequency bands, into a first time-frequency signal;
transforming the input audio signal into a second time-frequency signal, wherein the first and second time frequency signals represent relation between time and signal frequency respectively;
factorizing the first time-frequency signal into activity vectors composing a first activity matrix;

factorizing the second time-frequency signal into activity vectors composing a second activity matrix using the first activity matrix as a teacher activity; and separating the first audio component and the second audio component from the audio signal, using the activity vectors composing the second activity matrix.

19. A non-transitory computer readable medium storing a computer-executable program for causing a computer to perform a method of processing an audio signal, the method comprising:

inputting an audio signal in which a first audio component and a second audio component are mixed;

transforming the audio signal into a time-frequency signal representing relation between time and signal frequency;

determining intensity of the second audio component contained in the audio signal;

dividing the time-frequency signal into a plurality of frequency bands according to the intensity of the second audio component, wherein the second audio component includes wind noise;

factorizing a time-frequency signal in a frequency band, in which influence from the second audio component is small among the plurality of frequency bands, into activity vectors composing a first activity matrix;

factorizing the time-frequency signal transformed from the audio signal into activity vectors composing a second activity matrix using the first activity matrix as a teacher activity; and separating the first audio component and the second audio component from the audio signal, using the activity vectors composing the second activity matrix.

20. A non-transitory computer readable medium storing a computer-executable program for causing a computer to perform a method of processing an audio signal, the method comprising:

inputting an audio signal in which a first audio component and a second audio component are mixed;

transforming the audio signal into a time-frequency signal representing relation between time and signal frequency;

dividing the time-frequency signal into a plurality of frequency bands;

factorizing a time-frequency signal in a frequency band, in which influence from the second audio component is small among the plurality of frequency bands, into first activity vectors composing a first activity matrix;

factorizing the time-frequency signal transformed from the audio signal into second activity vectors composing a second activity matrix;

classifying the second activity matrix into a third activity matrix and a fourth activity matrix based on correlation between the first and second activity vectors; and separating the first audio component and the second audio component from the audio signal, using the third activity matrix and the fourth activity matrix.

* * * * *